US012270190B2

(12) United States Patent
Grody (10) Patent No.: US 12,270,190 B2
(45) Date of Patent: Apr. 8, 2025

(54) METHOD AND APPARATUS FOR CONTROLLING AUTOMATIC TOILET FLUSHING SYSTEM

(71) Applicant: Hydraze, Inc., Potomac, MD (US)

(72) Inventor: Charles Dylan Grody, Potomac, MD (US)

(73) Assignee: Hydraze, Inc., Potomac, MD (US)

( * ) Notice: Subject to any disclaimer, the term of this patent is extended or adjusted under 35 U.S.C. 154(b) by 292 days.

(21) Appl. No.: 18/087,307

(22) Filed: Dec. 22, 2022

(65) Prior Publication Data

US 2023/0175242 A1 Jun. 8, 2023

Related U.S. Application Data

(63) Continuation-in-part of application No. 17/168,629, filed on Feb. 5, 2021, now Pat. No. 11,739,513, and a continuation-in-part of application No. 16/745,140, filed on Jan. 16, 2020, now Pat. No. 11,866,922, and a continuation-in-part of application No. 16/251,235, filed on Jan. 18, 2019, now Pat. No. 10,941,552.

(60) Provisional application No. 62/620,425, filed on Jan. 22, 2018.

(51) Int. Cl.
*E03D 5/12* (2006.01)
*G05B 19/416* (2006.01)

(52) U.S. Cl.
CPC ............ *E03D 5/12* (2013.01); *G05B 19/416* (2013.01); *G05B 2219/37371* (2013.01)

(58) Field of Classification Search
CPC .............. E03D 5/12; E03D 5/105; E03D 5/10

USPC ............................................................ 4/313
See application file for complete search history.

(56) References Cited

U.S. PATENT DOCUMENTS

| | | | |
|---|---|---|---|
| 1,875,983 A | 9/1932 | Bourdet et al. | |
| 2,688,141 A | 9/1954 | Filliung | |
| 4,692,951 A | 9/1987 | Taki | |
| 6,018,827 A | 2/2000 | Shaw | |
| 7,028,374 B2 | 4/2006 | Fiocco | |
| 7,177,725 B2 | 2/2007 | Nortier et al. | |
| 7,814,582 B2 | 10/2010 | Reddy | |
| 8,695,125 B2 | 4/2014 | Funari et al. | |

(Continued)

FOREIGN PATENT DOCUMENTS

| | | |
|---|---|---|
| GB | 2165271 | 4/1986 |
| GB | 2488071 | 8/2012 |

(Continued)

OTHER PUBLICATIONS

International Search Report and Written Opinion in Application No. PCT/US2022/053847, dated Aug. 23, 2023, 18 pages.

(Continued)

*Primary Examiner* — Huyen D Le
(74) *Attorney, Agent, or Firm* — Joseph P. Quinn; ArentFox Schiff LLP (57) ABSTRACT

A method for controlling actuations of an automatic toilet flushing mechanism compares manual flush timestamps, latch open timestamps and latch close timestamps in association with uses of a toilet stall to generate a stall use profile. Automatic toilet flushing may be controlled based on the stall use profile. Stall usage data, toilet usage data and/or water usage data may be collected and provided for improved maintenance and water conservation.

19 Claims, 8 Drawing Sheets

(56) References Cited

U.S. PATENT DOCUMENTS

| | | | |
|---|---|---|---|
| 8,997,268 B2* | 4/2015 | Miller | E03D 9/10 |
| | | | 4/324 |
| 9,151,023 B2* | 10/2015 | Taylor | C02F 1/006 |
| 9,447,625 B1 | 9/2016 | Seebaransingh et al. | |
| 10,564,653 B2* | 2/2020 | Sitnikov | G05D 7/0623 |
| 10,941,552 B2 | 3/2021 | Grody | |
| 11,739,513 B2 | 8/2023 | Grody | |
| 11,866,922 B2 | 1/2024 | Grody | |
| 2002/0162166 A1 | 11/2002 | Saar | |
| 2003/0102450 A1* | 6/2003 | Parsons | E03D 3/02 |
| | | | 4/304 |
| 2005/0171709 A1 | 8/2005 | Nortier et al. | |
| 2006/0130223 A1 | 6/2006 | Yen | |
| 2008/0028507 A1* | 2/2008 | Ozenick | E03D 5/105 |
| | | | 4/313 |
| 2008/0072369 A1 | 3/2008 | Funari et al. | |
| 2009/0119142 A1 | 5/2009 | Yenni et al. | |
| 2012/0317709 A1 | 12/2012 | Oates | |
| 2014/0020166 A1 | 1/2014 | Metcalf | |
| 2014/0264110 A1 | 9/2014 | Wilson | |
| 2015/0233146 A1 | 8/2015 | Klevens et al. | |
| 2017/0051486 A1 | 2/2017 | Schomburg et al. | |
| 2017/0183853 A1* | 6/2017 | Crist | E03D 5/105 |
| 2018/0066422 A1 | 3/2018 | Allard, III | |
| 2018/0135285 A1 | 5/2018 | Canfield | |
| 2019/0089550 A1 | 3/2019 | Rexach et al. | |
| 2021/0222416 A1 | 7/2021 | Grody | |

FOREIGN PATENT DOCUMENTS

| | | |
|---|---|---|
| JP | H0729074 | 6/1995 |
| JP | H09221805 | 8/1997 |
| JP | 2004285729 A | 10/2004 |
| JP | 2006177064 | 7/2006 |
| JP | 2012022367 A | 2/2012 |
| JP | 2013072261 | 4/2013 |
| JP | 2014214594 A | 11/2014 |
| JP | 2018009289 | 1/2018 |
| JP | 2019141306 A | 8/2019 |
| KR | 930000595 Y1 | 2/1993 |
| KR | 20110104238 A | 9/2011 |
| WO | 2008046070 A2 | 4/2008 |
| WO | WO2017031473 | 2/2017 |
| WO | WO2019143879 | 7/2019 |

OTHER PUBLICATIONS

Notice of Submission of Opinion in Korean Application No. 10-2020-7022913 dated May 30, 2023 [English translation], 7 pages.
Communication pursuant to Article 94(3) EPC in Application No. 19703565.2 dated Jul. 19, 2023 (5 pages).
Notice of Reasons for Rejection in Japanese Application No. 2022-538901 dated Oct. 3, 2023 (with English translation), 7 pages.
International Preliminary Report on Patentability in Application No. PCT/US2019/014115, dated Aug. 6, 2020 (10 pgs.).
International Search Report and Written Opinion in Application No. PCT/US2019/014115 dated Apr. 9, 2019.
Office Action in JP Application No. 2020-560878, dated Nov. 4, 2022 with English translation (11 pgs.).
Decision to Grant in JP2020-560878 dated May 16, 2023 (3 pages).
International Search Report and Written Opinion in Application No. PCT/US2020/013866 (Oct. 1, 2020).
Notice of Submission of Opinion in Korean Application No. 10-2020-7022913 dated Dec. 19, 2023 [with English translation], 7 pages.

* cited by examiner

Figure 1(CONT): Main Process Flow

Advanced Computation Examples

Figure 3A: Flush Volume Modification by using Manual Flush data

Figure 3B: Preventing Redundant Flushing from Accidental Latch Locking

Sample of Raw Data

| Event Counter | Event | Timestamp | Battery Life |
|---|---|---|---|
| 1 | Slider Lock | 9/27/2022 6:27:23 PM | 98% |
| 2 | Slider Unlock | 9/27/2022 6:28:33 PM | 98% |
| 3 | Automatic Flush Start | 9/27/2022 6:28:35 PM | 98% |
| 4 | Automatic Flush End | 9/27/2022 6:28:36 PM | 98% |
| 5 | Slider Lock | 9/29/2022 4:31:23 PM | 97% |
| 6 | Manual Flush Start | 9/29/2022 4:31:29 PM | 97% |
| 7 | Manual Flush End | 9/29/2022 4:31:30 PM | 97% |
| 8 | Slider Unlock | 9/29/2022 4:31:33 PM | 97% |
| 9 | Automatic Flush Start | 9/29/2022 4:32:35 PM | 97% |
| 10 | Automatic Flush End | 9/29/2022 4:32:36 PM | 97% |
| 11 | Slider Lock | 9/30/2022 2:17:23 PM | 96% |
| 12 | Manual Flush Start | 9/30/2022 2:18:29 PM | 96% |
| 13 | Manual Flush End | 9/30/2022 2:18:30 PM | 96% |
| 14 | Slider Unlock | 9/30/2022 2:18:33 PM | 96% |
| 15 | Automatic Flush Disabled | 9/30/2022 2:18:35 PM | 96% |

500

501 — 1 Flush per Usage Cycle (rows 1–4)
502 — 2 Flush per Usage Cycle (rows 5–10)
503 — 1 Flush per Usage Cycle (rows 11–15)

Figure 6

Sample of Tabulated Data

| | Stall 1 | Stall 2 | Stall 3 | Stall 4 | Stall 5 | Stall 6 | Average |
|---|---|---|---|---|---|---|---|
| Total Cycles | 228 | 258 | 261 | 747 | 303 | 339 | 356 |
| Total Flushes | 296 | 303 | 278 | 799 | 325 | 360 | 394 |
| Sample Size of Days | 7 | 7 | 7 | 7 | 7 | 7 | 7 |
| Total Flushes Between Stall Uses | 53 | 26 | 11 | 22 | 8 | 22 | 22 |
| Cycles with <1 Flush per Use | 0 | 0 | 0 | 0 | 0 | 0 | 0 |
| Cycles with 1 Flush per Use | 211 | 235 | 257 | 715 | 290 | 338 | 338 |
| Cycles with >1 Flush per Use | 16 | 24 | 5 | 33 | 14 | 18 | 18 |
| % of Cycles with <1 Flush per Use | 0% | 0% | 0% | 0% | 0% | 0% | 0% |
| % of Cycles with 1 Flush per Use | 93% | 91% | 98% | 96% | 96% | 95% | 95% |
| % of Cycles with >1 Flush per Use | 7% | 9% | 2% | 4% | 4% | 5% | 5% |
| Average Flushes per Cycle | 1.30 | 1.17 | 1.07 | 1.07 | 1.07 | 1.06 | 1.11 |
| % of Uses with Manual Flush before Mid-Cycle Flag | 5% | 6% | 1% | 3% | 3% | 4% | 4% |
| % Change of Flush Volume from Default Value | -8% | -12% | -3% | -4% | -8% | -16% | -7% |
| Average Flushes per Cycle Adjusted for Volume Reduction | 1.20 | 1.03 | 1.04 | 1.03 | 0.98 | 0.89 | 1.03 |
| Projected Annual Water Consumption (thousands of gallons) | 7.95 | 6.82 | 6.88 | 9.22 | 6.49 | 5.90 | 7.10 |
| Projected Annual Water Savings | $143 | $180 | $174 | $244 | $197 | $202 | $190 |

Figure 7

METHOD AND APPARATUS FOR CONTROLLING AUTOMATIC TOILET FLUSHING SYSTEM

CROSS-REFERENCE TO RELATED APPLICATIONS

This application is related to and claims the priority of U.S. patent application Ser. No. 16/745,140 entitled PROGRAMMABLE TOILET FLUSH INITIATING, MONITORING AND MANAGEMENT SYSTEM AND METHOD THEREOF filed on Jan. 16, 2020; patent application Ser. No. 17/168,629 entitled PROGRAMMABLE TOILET FLUSH INITIATING, MONITORING AND MANAGEMENT SYSTEM AND METHOD THEREOF filed on Feb. 5, 2021; U.S. patent application Ser. No. 16/251,235 entitled PROGRAMMABLE TOILET FLUSH INITIATING, MONITORING AND MANAGEMENT SYSTEM AND METHOD THEREOF filed on Jan. 18, 2019; and U.S. Provisional Application No. 62/620,425 entitled PROGRAMMABLE TOILET FLUSH INITIATING, MONITORING AND MANAGEMENT SYSTEM AND METHOD THEREOF filed on Jan. 22, 2018, the contents of each of which are incorporated herein by reference in their entirety.

FIELD OF THE INVENTION

The present invention is in the field of facilities management technologies, and more particularly in the field of automatic control and tracking of water flow in a facility to reduce water usage.

BACKGROUND

Optimizing water consumption of toilets can be critical for a variety of environmental and economical reasons. To attain a desired level of optimization, the ability to manipulate a number of variables and/or data inputs is necessary. However, avoiding redundant flushes is often paramount among concerns of unnecessarily wasting water, and therefore Automatic Flushing requires further specialization.

SUMMARY

Aspects of the present disclosure implement a logical process flow using multiple data inputs for determining when to flush and when not to flush a toilet in a toilet stall. Data received from a latch on the toilet stall door is used to determine the beginning and end of each usage of that stall. Timestamps of multiple events are compared to facilitate reductions in water usage by the toilets.

According to aspects of the present disclosure, a manual flush timestamp is compared to latch data timestamps, to allow a controller to calculate whether the most recent manual flush should negate the need for an Automatic Flush. A number of uses where the manual flush did not negate an Automatic Flush is recorded. This feedback may be used to determine whether and when water volume to one or more toilets should be adjusted. The water volume may be adjusted automatically through a pre-programmed set of instructions, or a facilities manager may be notified to change the water volume manually. Adjustments to the water volume may be recorded for each toilet and may be included in a data profile for a corresponding toilet or stall, for example.

According to another aspect of the present disclosure, the frequency and timing of latch opening and/or latch closing events are compared relative to each other and relative to recent Automatic Flushes. Based on the comparisons, the duration of a usage cycle may be determined. The usage cycle duration is compared to a predetermined range of usage times to evaluate whether a latch actuation will trigger a flush or if the latch actuation may have been accidental. Redundant flushes due to accidental latch events can thereby be prevented.

According to an aspect of the present disclosure, a combination of latch data, Automatic Flush data and manual flush data is evaluated to determine start times and end times of toilet stall usage cycles. An average number of flushes per stall usage cycle may then be computed. This provides a basis for evaluating the performance and accuracy of a specific stall and allows the performance of multiple stalls to be compared. According to the present disclosure, multiple Automatic Flushing technologies may be compared through a standard process as described herein, which can be used for benchmarking purposes. Moreover, the present disclosure provides data that enables the use of predictive machine learning methodologies for determining when to flush or how much water to use to flush a toilet.

DETAILED DESCRIPTION

Aspects of the present disclosure include a system and method for optimizing water consumption of toilets by leveraging several data inputs both directly and/or impliedly provided.

In some contexts, the unlocking of a slider can trigger an Automatic Flush. While this is generally how the system works, there are cases where this process can result in redundant flushes. In an effort to reduce instances of this behavior, additional data points, relating to and collected when the stall is locked, stall is unlocked, the toilet has been manually flushed, and the toilet has been automatically flushed, for example, are automatically collected and evaluated. It is possible to use recorded data to optimize the toilet's flush volume, also saving more water.

The present disclosure introduces several terminologies and definitions provided herein, which may be applied to the present embodiments. "Slider Locked", or "slider is locked", can mean that the slider is in the first position where the proximal end of the slider is positioned in the door locking chamber. "Slider Unlocked", or "slider is unlocked", can mean that the slider is in the second position where the proximal end of the slider is free from the door locking chamber. "Manual Flush" can refer to any instance where a user initiates a flush with a toilet handle, lever or button. According to some embodiments of the present disclosure, it is assumed that an electrical button is the method for implementing a manual flush. This button is an electrical push button that is wired to send a signal to the toilet flushing controller to have the toilet flushing actuator implement a flush. The signal from the button to the toilet flushing controller can be used to set a manual flush flag and/or recorded as a manual flush to the controller's Non-Erasable Memory and/or processing queue. Other methods of manual flushing, such as a toilet handle or lever, may also send electrical signals to the toilet flushing controller. If they operate independently of the electronics, an additional component, a "Manual Flush Sensor" may be used to sense the position of the toilet handle, non-electrical button, or lever and send a signal to the toilet flushing controller that a manual flush has been implemented.

The present disclosure also introduces the term "Automatic Flush" when referring to embodiments herein, which may involve a flush implemented by the toilet flushing actuator based on a signal from the toilet flushing controller that was not the result of a manual flush. This could be, for example, the result of the user unlocking the slider or a pre-programmed daily flush. "Latch data" can refer to data collected from the sensor that determines the position of the slider and records it as the slider is locked or the slider is unlocked. According to the present embodiments of the present disclosure, to "implement" or "initiate" a flush can have the same meaning, as they both mean to cause a flush from start to finish. Additionally, the "controller" in this system can be a broad term that refers to the toilet flushing controller, door housing controller, the system controller, or a combination of the three that can be programmed to dictate the instructions of the Main Process Flow referenced in FIG. 1.

According to the exemplary embodiments described herein in detail, "Non-Erasable Memory" can refer to any location or method of data storage that saves data long term. Typically, data stored in Non-Erasable Memory will be presented directly or indirectly to the facilities manager. Examples of Non-Erasable Memory can be but are not limited to an SD card, USB drive, a cloud network, in the controller's memory, or any other method of data storage. "Record" can be a broad term used when data is collected by the controller. Record can include several data points about a single event, including but not limited to, a timestamp, battery life reading, and signal strength. An "input" or "interrupt" can be a physical action by a user, or an electrical change within the circuitry of the system, that changes the system's state. This is an unprocessed signal that disrupts the controller's Main Process Flow. Additionally, an "event" can be interpreted as referring to an interrupt that has been pre-processed through the Interrupt Process Flow in, for example, FIG. 2, and has entered the processing queue of the Main Process Flow. Further, "event type" can refer to how an event is classified based on the part of the system that was changed. This includes, but is not limited to, "Slider Locked," "Slider Unlocked," "Manual Flush," and "Automatic Flush."

Figure 1:
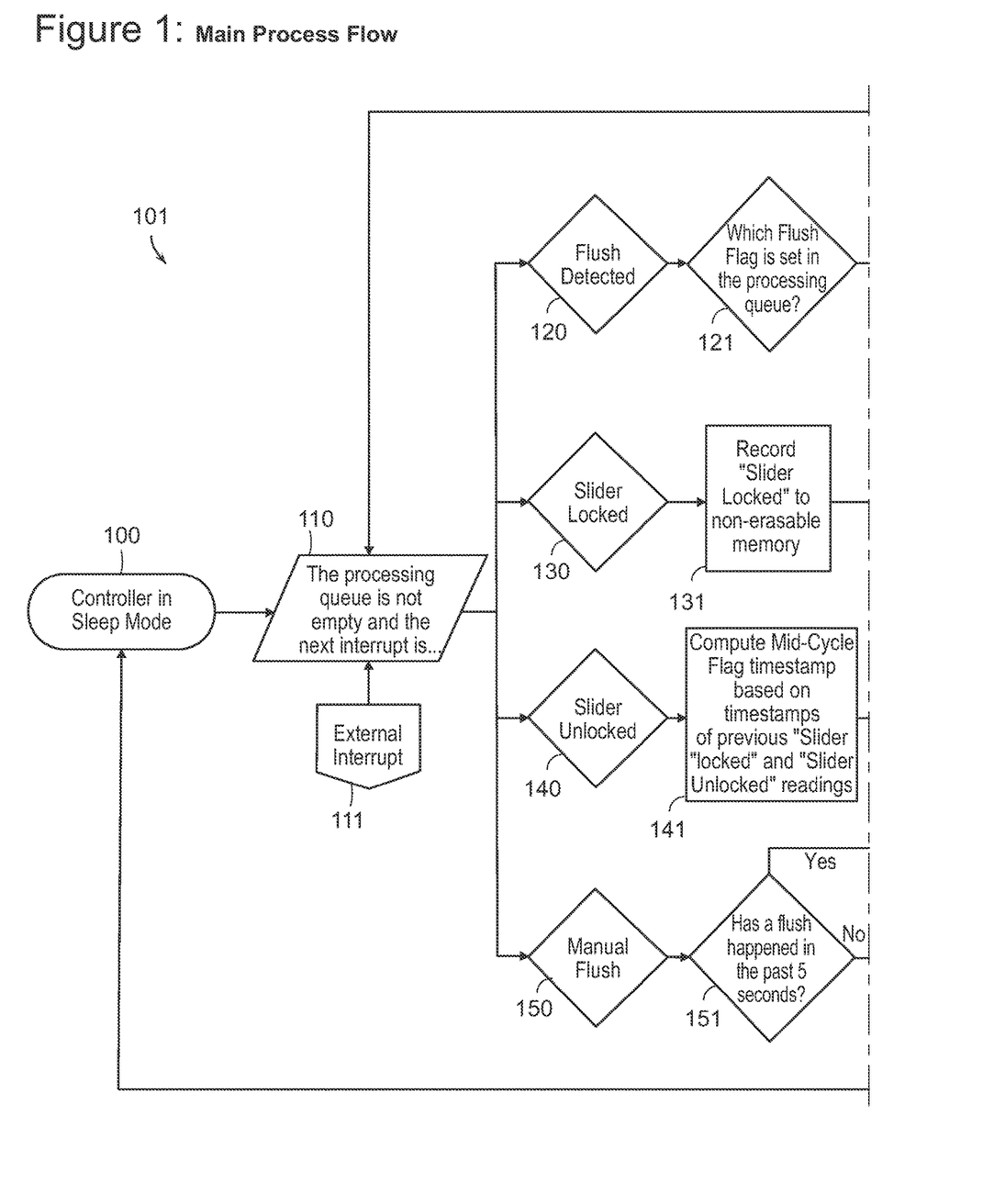
FIG. 1 is the Main Process Flow used by the controller that determines when to flush and when to record data based on external inputs to the system.

According to the exemplary embodiments described herein in detail, the "Main Process Flow," as depicted in FIG. 1, is the general set of programmable instructions that the controller follows. The "Interrupt Process Flow," as depicted in FIG. 2, is the general set of programmable instructions for when an input is detected, pre-processed, and either ignored or sent to the Main Process Flow as an event. Additionally, "Sleep Mode" can refer to a low power state for the controller. The controller is in Sleep Mode when there are no commands to actively implement. Remaining active when there are no commands to implement can adversely increase the power consumption of the controller.

According to the exemplary embodiments described herein in detail, the "processing queue" is where event data can be temporarily saved while the controller is processing other events or interrupts. The "Mid-Cycle Flag" is a pre-programmed, but optionally adjustable, timestamp calculated by the controller as a midway point through the use. It is used to determine whether or not the most recent manual flush should disarm the upcoming Automatic Flush. The "Sensor" is already defined in previous filings as an element of the system for "sensing the position of the slider." To further clarify that definition, the sensor can sense when the slider is locked, when the slider is unlocked, and/or when the slider is in a transitory position between those two positions.

While not depicted in previous filings, it can be implied by the present disclosure that there is a "Toilet Flushing Sensor" as part of the toilet flushing mechanism, as shown in FIG. 1. This Toilet Flushing Sensor can be, but is not limited to: an electric current flow sensor to detect the passage of current in the electronics of the toilet or an electric voltage sensor to detect a voltage change of the toilet flushing actuator or other component of the toilet electronics.

FIG. 1 shows the Main Process Flow system 101 used by a controller to determine when to flush and when to record data based on external inputs to the system 101. The controller will generally be in a Sleep Mode to conserve power, as shown in Step 100. According to the illustrative example, the method for the controller to be woken from Sleep Mode is by an interrupt. Whether the controller is in sleep mode 100 or awake and executing a function, if an interrupt is detected at 111, the controller's priority immediately becomes pre-processing that interrupt 111, as depicted in the Interrupt Process Flow system 210 and 202 in FIGS. 2A and 2B. According to the system 101 shown in FIG. 1, the controller will stop its current function, pre-process the interrupt 111, discard it or add it to the processing queue as an event 110, and then resume where it last left off in the Main Process Flow 101. In this example, the order for which events are processed is chronological in the order that the interrupt(s) 111 occurred, but other orders could be used instead. After all events have been processed and additional computations are completed, the controller will erase the processing queue data and return to Sleep Mode 100.

Once an interrupt is pre-processed and enters the Main Process Flow 101 as an event 110, the method for processing is determined based on the event type. If the event type is "Flush Detected" 120, the controller will read the most recently set flush flag to determine at 121 if the flush type was manual 124 or automatic 122, and then record the information to the Non-Erasable Memory at 123 (if automatic 122) or 125 (if manual 124). While not depicted in FIG. 1, the controller may optionally record both 123 and 125 for a flush that has been initiated, the timestamps of when the flush started and when the flush ended, based on the electronic signals within the circuitry of the toilet. Alternatively, if the event type is "Slider Locked" 130, then the only instruction in this case is for the event to be saved to the Non-Erasable Memory at 131.

According to the illustrative example in FIG. 1, if the event type is "Slider Unlocked" 140, then the first step is to compute a timestamp for a Mid-Cycle Flag at 141. Then, multiple conditions must be met for the controller to implement a flush at 144. Next, the controller will determine if the slider was locked for between 7 and 900 seconds at 142 (this time range can be adjusted) and if the most recent manual flush occurred before the Mid-Cycle Flag at 143. If both of these conditions 142 and 143 are met, an Automatic Flush will be implemented and the Automatic Flush flag will be set at 144. Otherwise, the Automatic Flush will not be implemented. While not depicted, it may be helpful for troubleshooting purposes to record that an Automatic Flush was disabled and the reason why. Whether or not the Automatic Flush is implemented, the last step of this branch is that the "Slider Unlocked" event will be recorded to Non-Erasable Memory at 145. Continuing with the illustrative embodiment shown in FIG. 1, if the event type is "Manual Flush" 150, it means that the button has been pressed by the user. In the event that the manual flush mechanism is an electronic button, the controller can intercept the signal and optionally prevent the toilet flushing actuator from initiating the flush if a previous flush happened within the past 5 seconds at 151 (this time can be adjusted). If no flush happened within the past 5 seconds or the manual flush mechanism is not electronically joined to the toilet flushing actuator, then the manual flush will be initiated and the manual flush flag will be set at 152. Otherwise, no flush will be implemented and nothing will be saved to Non-Erasable Memory.

Referring again to FIG. 1, before the controller returns to sleep mode 100, it will check to make sure that there are no other values 110 that need to be processed in the processing queue at 160. If all data in the queue has been processed, the controller may perform optional additional computation to adjust controller functionality at 161. These additional computations may add or delete steps in the Main Process Flow 101. This will be addressed in greater detail in the explanation of FIG. 3. Finally, the controller will erase everything in the processing queue, except for the flush flag, and return to sleep mode 100.

While not explicitly depicted in FIG. 1, the Main Process Flow 101 can selectively record any intermediate step to the Non-Erasable Memory. This could be useful for troubleshooting errors. One such example would be that the controller could record when a flush is implemented. According to the present disclosure, recording when a flush is implemented and then when it is detected would further verify that the controller functioned correctly. If one of those two steps was not recorded, then it could indicate an error has occurred and the controller could notify the facilities manager.

Figures 2A, 2B:
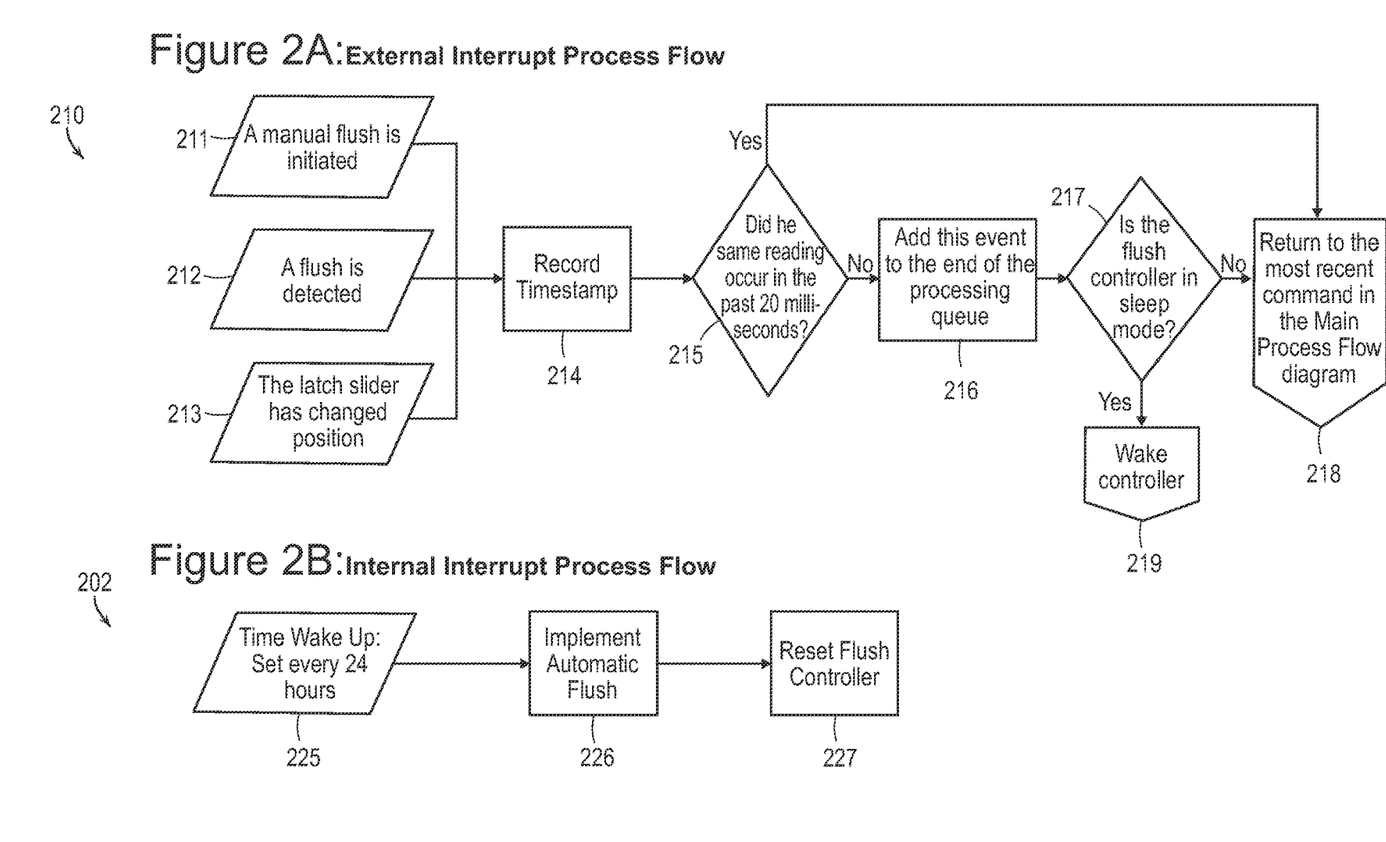
FIG. 2A shows the steps for how external interrupts are pre-processed to determine if they should enter the Main Process Flow or be disregarded.
FIG. 2B shows an internal interrupt where the controller wakes itself based on a 24 hour timer, initiates an Automatic Flush, and then resets itself.

FIGS. 2A and 2B depict examples where every interrupt must be pre-processed through an Interrupt Process Flow. According to exemplary embodiments of the present disclosure, each show the user or controller-initiated events that will wake the controller from sleep mode, and how they are pre-processed to determine if they should enter the Main Process Flow 101 or be disregarded. FIG. 2A, showing External Interrupt Process Flow 210, depicts three possible but non-exhaustive external inputs that are either directly or indirectly triggered by a user including when a manual flush is initiated at 211, when a flush is detected at 212, and when the latch slider has changed position at 213. Depending on the quality or design of the electronics, some external inputs may create several redundant signals within a short period of time (in the scale of microseconds to seconds). The External Interrupt Process Flow 210 in FIG. 2A is designed to filter out redundant external inputs. Once an external interrupt is detected, the first step is to record the timestamp 214 and then check whether that input was already recorded in the past 20 milliseconds at 215 (this time range can be adjusted, for example, from the scale of microseconds up to 5 seconds). If so, the data point will effectively be filtered out at 218, which means it is not added to the processing queue and the controller will return at 218 to its previous function in the Main Process Flow 101, as shown in FIG. 1. If not filtered out, then the system will consider at 217 if the controller is in sleep mode, and if so, wake the controller for processing at 219 after being added to the end of the processing queue at 216. It should be noted that 20 milliseconds can be increased or decreased. Alternatively, the controller can chose to filter all but the last interrupt in the 20 millisecond window. This is just one example of how redundant signals can be filtered. In other embodiments, more thorough methods of filtering may be required. For example, when an external interrupt is detected, the system can be programmed to filter out some or all other signals from its original sensor and/or some or all other sensors for 20 milliseconds thereafter.

The present disclosure also includes the Internal Interrupt Process Flow 202 of FIG. 2B as an optional and additional method of waking up the controller based on a pre-programmed 24-hour timer. Every 24 hours, this interrupt would wake the controller at 225, implement an Automatic Flush at 226, and then reset the controller at 227. Resetting the controller would primarily be useful if the controller is stuck in an error state. In such an example, automatically resetting the controller could fix the issue, reducing the likelihood that an error in the controller would require an in-person maintenance visit.

Figure 3A:
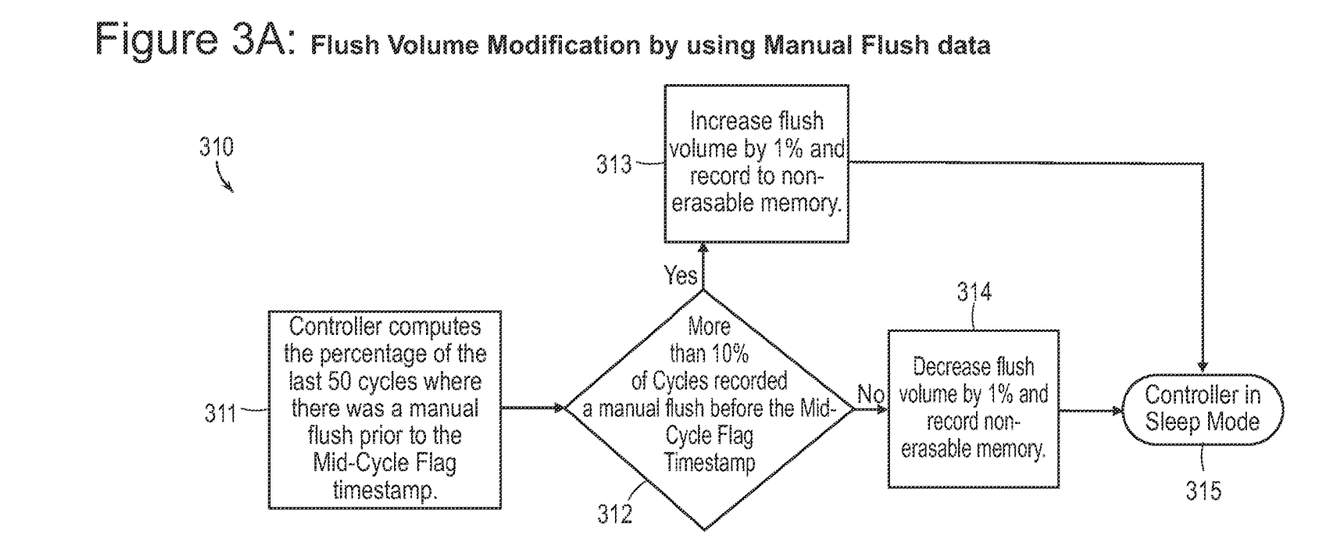
FIG. 3A shows a process flow for the controller automatically adjusting the water volume of a toilet based on external input of users pressing the manual flush button prior to the Mid-Cycle Flag of a usage cycle.
Figure 3B:
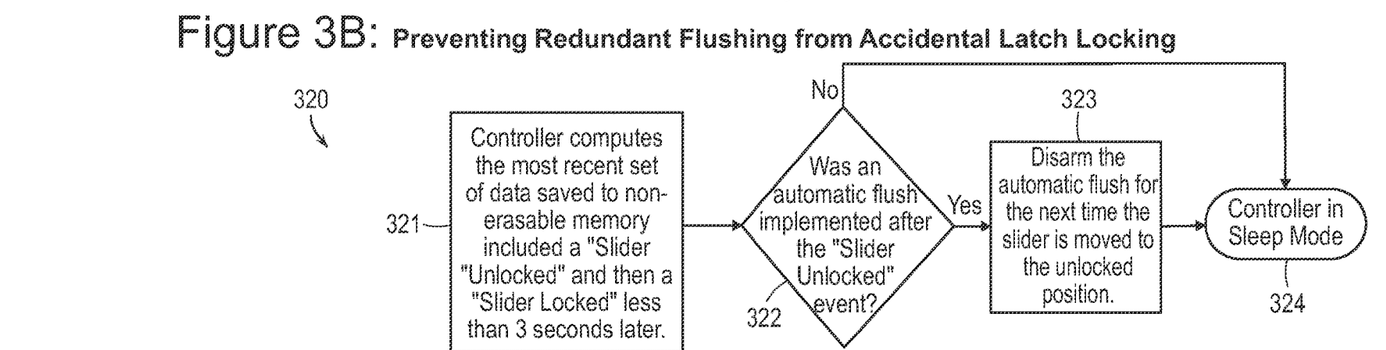
FIG. 3B shows a process for eliminating redundant flushes that may happen if a user accidentally moves the slider into the locked position without it being chambered in the door locking chamber.

The present disclosure further includes FIGS. 3A and 3B, which include Advanced Computation Examples. In each, the controller has the ability to use advanced computing techniques to further improve its performance and water consumption reduction.

One such example, in reference to FIG. 3A, is to analyze a percentage of usage cycles from a recent sample size, where a manual flush was implemented before the Mid-Cycle Flag, to adjust water volume as part of Process 310. If users are frequently implementing a manual flush at the beginning of the stall usage cycle, it could be an indication that the toilet flush volume is too low. Conversely, if there is a low frequency of manual flushes implemented at the beginning of the usage cycle, it could be an indication that the toilet is flushing with more water volume than necessary. In FIG. 3A, the controller is programmed to analyze how often the manual flush was implemented in the prior 50 usage cycles at 311. If greater than 10% of uses recorded the manual flush before the Mid-Cycle Flag is calculated at 312, this would indicate that the flush volume is too low, so the controller would increase the flush volume by 1% after each use at 313. The controller will continue to do so for each usage cycle until the percentage of manual flushes implemented prior to the Mid-Cycle Flag drops below 10%, in which case it will start decreasing the flush volume by 1% at 314. Process 310 will eventually relegate the controller to sleep mode at 315 once Process 310 is satisfied. These automatic water volume adjustments allow the controller to dynamically optimize the water consumption of each toilet and even reduce it beyond what the toilets are typically rated for. This approach is not limited to incrementing flush volume after every usage cycle. In some embodiments, the system can be programmed to make flush volume adjustments after sets of multiple usage cycles (for example, one set may involve 5 usage cycles or 10 usage cycles).

While the example in FIG. 3A uses the frequency of manual flushes to adjust water volume, according to the exemplary embodiments of the present disclosure, there are several other inputs or computations that could also adjust water consumption. For example, the duration of time between a lock and unlock and/or the time of day/week/month/year of the usage cycle could be indications of when to adjust volume. The percentages and sample sizes could be adjusted automatically with an algorithm to optimize water consumption or based on the preference of the Facilities Manager. In some embodiments, the controller can be configured to analyze samples from a previous period (as described above) or periods of time (for example, all flushes in the last day or week) and make water volume adjustments on a time-based schedule (for example, update the water volume at midnight every day). Also, these are just a few of many possible methods for adjusting the water volume. Machine learning or artificial intelligence could be used to further optimize water consumption reduction.

Referring now to FIG. 3B, a method for reducing redundant Automatic Flushes is depicted via Process 320. Sometimes at the end of a use, after the user retracts the slider such that the slider is unlocked, they may accidentally extend the slider such that the proximal end of the slider is fully extended in the location where it would be in the first position, except it is not chambered in the door locking chamber. The next user would then be required to first move the slider into the second position such that the slider is unlocked so that they can move the slider back into the first position where the slider is locked and chambered it into the door locking chamber. The process flow 320 in FIG. 3B would detect this pattern at 321, consider if yes or no at 322, and disable the Automatic Flush at 323 that would otherwise happen when the second user moves the slider to the second position at the beginning of their use, thereby preventing a redundant flush. Again, Process 320 will eventually relegate the controller to sleep mode at 324 once Process 320 is satisfied.

Figure 4A:
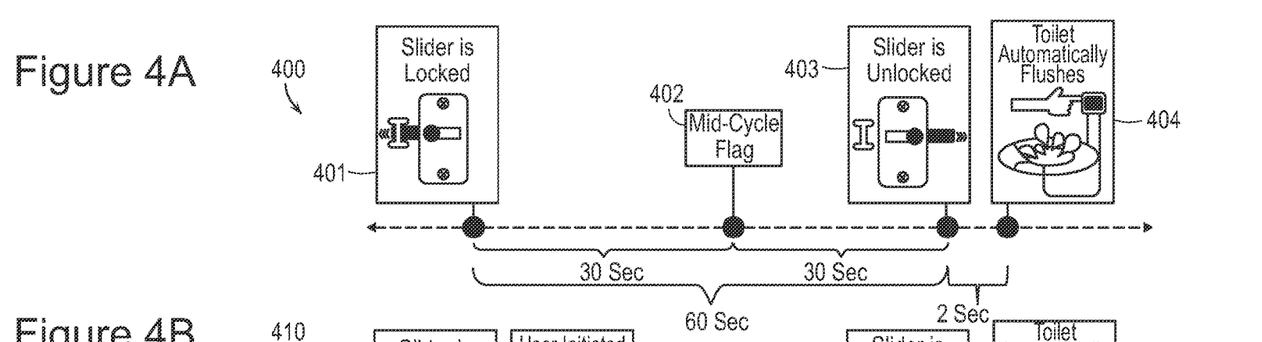
FIG. 4A shows a usage cycle where the manual flush button was not pressed.
Figures 4B, 4C:
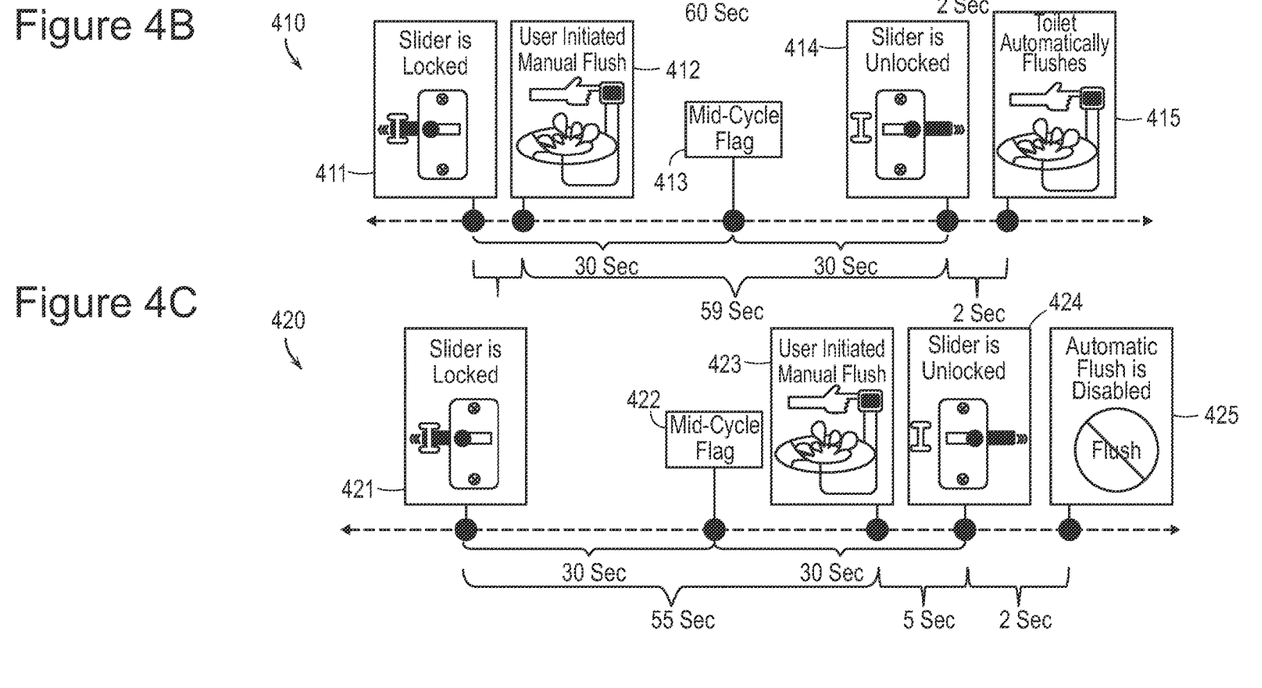
FIG. 4B shows a usage cycle where the manual flush button was pressed before the Mid-Cycle Flag timestamp and therefore the controller did not disable an Automatic Flush from being implemented at the end of the usage cycle.
FIG. 4C shows a usage cycle where the manual flush button was pressed after the Mid-Cycle Flag timestamp and therefore the controller disabled an Automatic Flush from being implemented at the end of the usage cycle.

The present disclosure further includes FIGS. 4A-4C, which provide visual representations of what usage cycles can look like with the disclosed system. According to the illustrative examples, the Mid-Cycle Flag timestamp was calculated by the controller for a period of time between the slider being moved to the locked position and the slider being moved to the unlocked position.

In these examples depicted in FIGS. 4A-4C, the Mid-Cycle Flag is calculated as the halfway point of each cycle at 402, 413, and 422, respectively. Each cycle was 60 seconds long, so the halfway mark for those usage cycles was 30 seconds after the slider was unlocked. The Mid-Cycle Flag can be calculated other ways as well. Instead of halfway through the use, it can be set as a quarter, two thirds, three quarters, or any other fraction of the total usage cycle from 0 seconds to the last second of the usage cycle duration. Additionally, instead of calculating, the controller can set a specific time, such as 20 seconds after the slider unlock was recorded.

According to the exemplary embodiments of the present disclosure, other mathematical techniques can be used instead of a Mid-Cycle Flag to calculate whether or not to automatically flush based on the most recent manual flush. One such example could be to compare the timestamps of the most recent slider lock, slider unlock, and manual flush. If the manual flush happened more closely in time to the slider unlock, then disable the Automatic Flush. If the manual flush happened closer in time to the slider lock, then initiate the Automatic Flush.

FIG. 4A shows a usage cycle 400 where the slider is locked at 401 and the slider is then unlocked at 403, wherein a manual flush button was not pressed, and the toilet automatically flushed at 404. The Mid-Cycle Flag was calculated at 402, but was not needed for this use because there was no manual flush during the use. FIG. 4B shows a usage cycle 410 where the manual flush 412 happens within a second of the slider being locked at 411. Since this was before the Mid-Cycle Flag 413, the toilet still automatically flushed at 415 after the slider was unlocked at 414. Further, FIG. 4C shows a usage cycle 420, initially with the slider locked at 421, when the manual flush 423 happens after the Mid-Cycle Flag 422 and the slider is unlocked at 424, therefore disabling the Automatic Flush at 425 for that use.

It is contemplated by the present disclosure that the duration of the usage cycle for each use in the examples depicted in FIGS. 4A-4C is 60 seconds, but in reality, usage times can vary significantly. For example, in the illustrative example depicted in FIG. 1, the controller deems any usage cycle between 7 seconds and 900 seconds to be a usage cycle that will warrant an Automatic Flush, but the time range can be wider or shorter. Additionally, the 2 second delay between the slider unlocking and the Automatic Flush occurring can be increased or decreased as a default setting or by the Facilities Manager through the controller.

Figure 5:
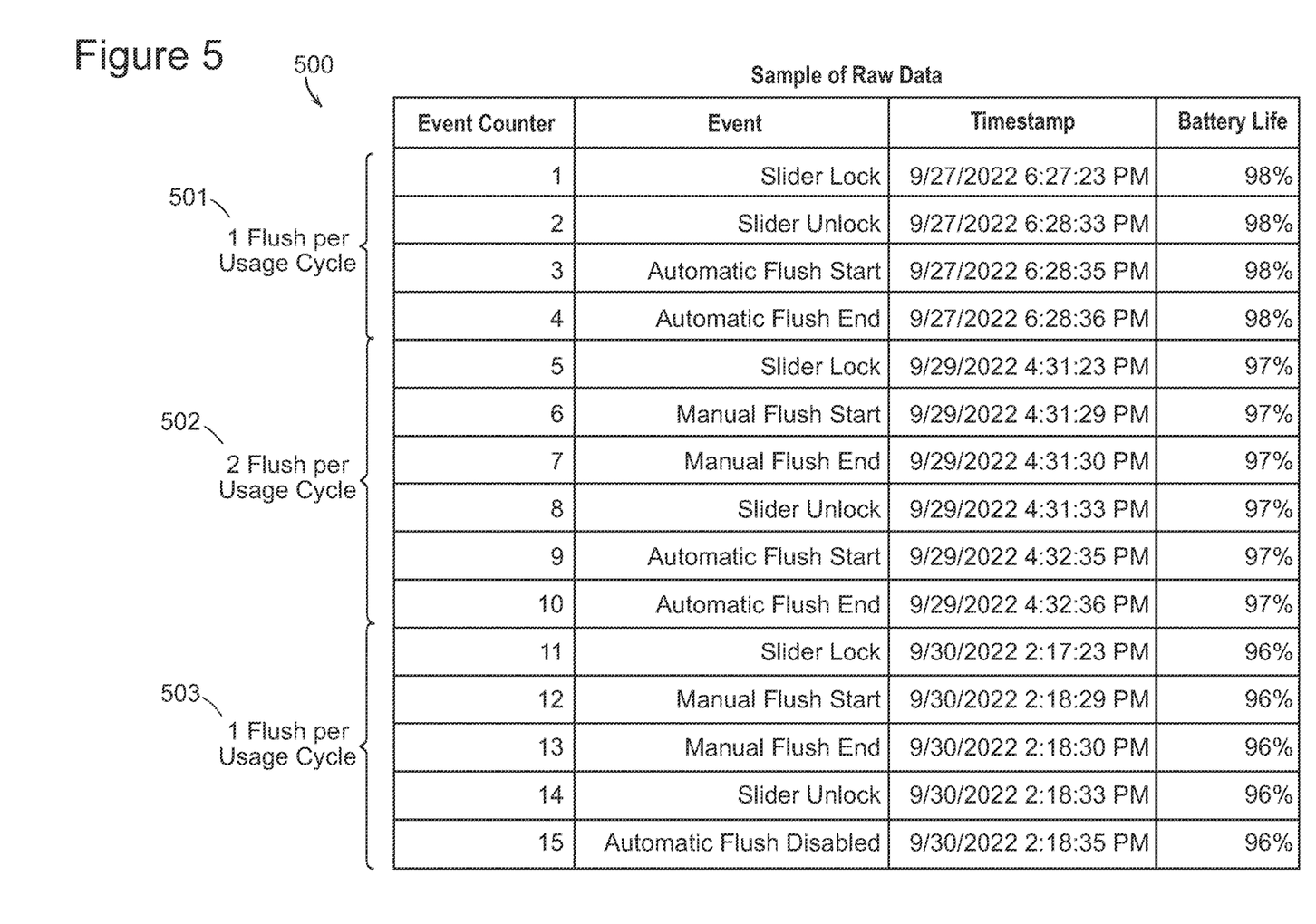
FIG. 5 shows a sample of data recorded by the controller and how it can be interpreted in the context of usage patterns.

The present disclosure also includes FIG. 5, which shows at 500 example raw data that the controller could save to the Non-Erasable Memory in an embodiment where the flush start and flush end times are electronically recorded. The exemplary embodiments herein include many methods to analyze this data. One such method is to look at a combination of expected patterns and timestamps of the data to determine when a usage cycle happened, what types of flushes happened during that usage cycle, and how many flushes happened during that usage cycle. FIG. 5 includes example sets 501, 502, and 503, of a variety of different event combinations. For example, it may be likely that events 1, 2, 3, and 4 are part of the same usage cycle for two reasons. The first reason is that all the events happened within two minutes of each other. The second is because the type of events recorded follow an intuitive logical flow of how a user might use a stall. It would be expected that the user would lock the stall door at the beginning of the use, then unlock it at the end of the use. Upon the unlocking, it would be expected for an Automatic Flush to start and then end a second later. This usage cycle indicates that, for the illustrative example, there was only one flush for that use. Events 1-4 are indicative of the cycle depicted in FIG. 4A. Events 5-10 are indicative of the cycle depicted in FIG. 4B. Events 11-15 are indicative of the cycle depicted in FIG. 4C. According to the exemplary embodiments herein, there are many different algorithms that the controller can use to determine what a cycle is and how many flushes occurred during that use. The controller can compute and tabulate the results immediately as the data is received or on a scheduled basis (such as a time interval or after a certain number of data points are received).

Figure 6:
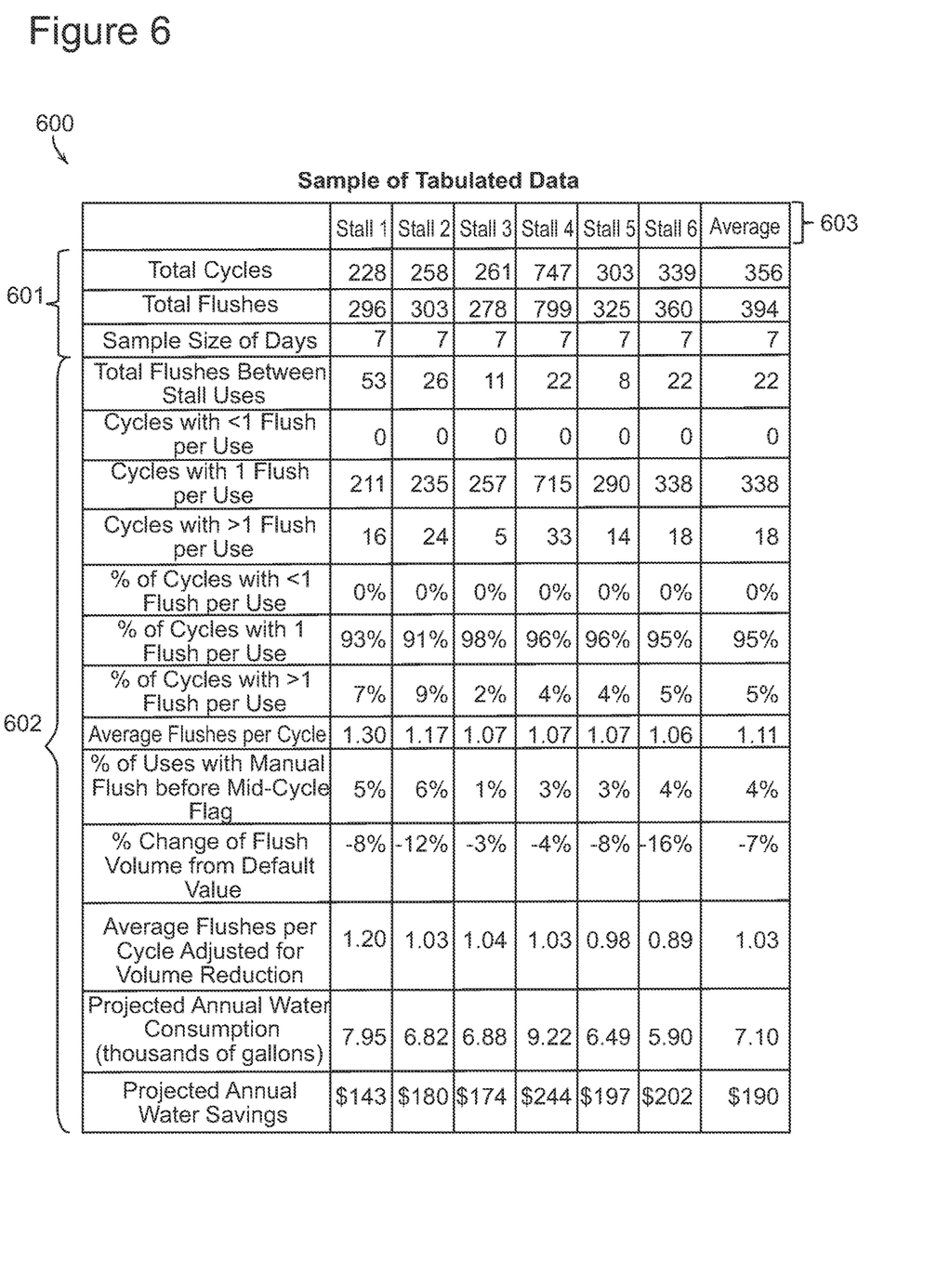
FIG. 6 shows a sample of tabulated results, insights, and savings projections based on data collected from a bathroom with 6 stalls.

FIG. 6 shows an example view 600 of tabulated results and analysis from data collection from a bathroom of 6 stalls according to the exemplary embodiments of the present disclosure. It is contemplated that this can provide insights into the frequency of usage, accuracy, and water reduction of each stall. FIG. 6 includes example sets 601 and 602 of a variety of different event and categorical combinations. Example set 601 shows a count of some events that occurred, while example set 602 shows calculations and interpretations of the data. The top row 603 labels each stall with its respective data column. Generally, over 90% of usage cycles with 1 flush per use would be expected for the flushing method in this disclosure. The Average Flushes per Cycle category makes it possible to compare the water consumption across multiple stalls, even as they each may see a different total number of cycles or flushes. Tracking how often the manual flush happened prior to the Mid-Cycle Flag, and the percentage change in flush volume, allows the Facilities Manager to see how and why flush volume has been adjusted. The results table can be formatted differently and include more or fewer categories. This table is just an example of some of the data and insights that can be displayed.

It should be noted that the method of recording the Average Flushes per Use can be applied to other methods of flushing, besides those initiated by the stall latch, for the purpose of benchmarking different types of Automatic Flushing technology. For example, using a stall latch that records the slider activity, in conjunction with a toilet that uses a distance sensor and/or manual handle, can compute the same average flush per use data. Recording this data across multiple brands of Automatic Flushing technology can provide insights as to which brand is the most accurate and most water efficient. This could also provide a basis for testing and improving alternative methods of Automatic Flushing, which could include the application of machine learning or artificial intelligence to predict when to flush and how much water to flush.

Figure 7:
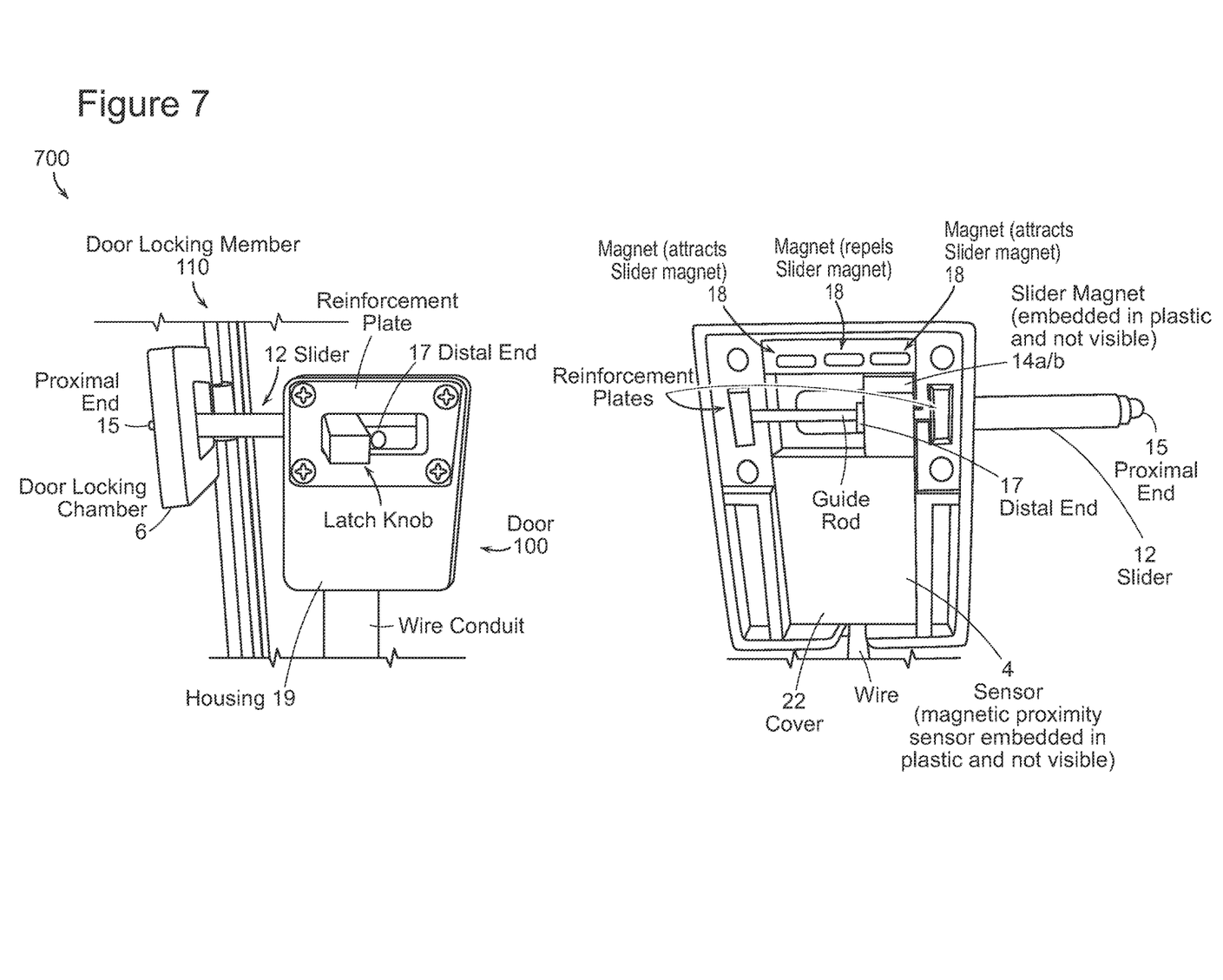
FIG. 7 shows photos of the current design of the latch and is labeled with the figure numbers from prior filings.

FIG. 7 shows view 700 of exemplary depictions of the hardware which may be included to facilitate the system and method of the present disclosure. In the present disclosure, the slider 12 is operatively joined to the housing 19. In FIG. 7, the sensor 4 is not visible within the figure because it is embedded within the housing 19. The magnet 14*a/b* is not visible because it is embedded in a plastic enclosure adjacent to and operatively joined with the slider 12. The magnet 14*a*/14*b* is located on the distal end 17 of the slider 12. The sensor 4 is a magnetic proximity sensor that is triggered by the magnet 14*a/b*. The sensor 4 is fixed in a location where it can discern whether the slider 12 is in either the first position or second position. There are three magnets 18. The two magnets 18 on either edge within the housing 19 are aligned to attract the magnet 14*a/b*, while the middle magnet 18 that is aligned to repel the magnet 14*a/b*. The alignment of these three magnets 18 is designed to secure the slider in either the first position or the second position, reducing the possibility that the slider 12 will be stuck between the two positions. Additional components that are not depicted in this exemplary design, but are identified in prior fillings, include the door housing controller 27, the signal emitter 1, the battery compartment 26, the batteries 25, the photovoltaic cells 23, and the SD card 28. Since this exemplary design in FIG. 7 is hardwired, all of the components not depicted in FIG. 7 are located within the toilet flushing mechanism 112. However, it should be noted that this is one of many possible configurations. It should also be noted that the style of latch is not limited to the style depicted in these FIG. 7 and figures from prior fillings. In other configurations, for example, it can be a door knob, a twisting knob, or dead bolt. Additionally in other configurations, the stall door, stall post, and/or one or more attachments to the stall door or post may have one or more sensors to determine the position of the door, latch, and/or attachments which can be used to determine when the door is closed or open in place of or in addition to whether the slider is locked or slider is unlocked.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method for controlling actuations of an automatic toilet flushing mechanism, the method comprising:
   acquiring and storing a manual flush timestamp in association with each occurrence of a manual flush of a toilet in a toilet stall;
   acquiring and storing a latch open timestamp in association with each unlatching of the door latch configured on a door of the toilet stall;
   acquiring and storing a latch close timestamp in association with each latching of the door latch;
   comparing the manual flush timestamp, the latch open timestamp, and the latch close timestamp to generate a stall use profile;
   determining whether to actuate an Automatic Flushing of the toilet based on the stall use profile.

2. The method of claim 1, comprising:
   triggering an Automatic Flush of the toilet at the determined time to flush; and
   recording an Automatic Flush timestamp in association with the triggering.

3. The method of claim 1, comprising:
   determining a beginning time and an end time of a stall usage of the toilet stall based on the stall latch open timestamp and the latch close timestamp.

4. The method of claim 1, comprising:
   computing whether to forgo an Automatic Flush based on a comparison of the most recent manual flush timestamp with the latch open timestamp and/or the latch closed timestamp; and
   negating an Automatic Flush actuation in response to computing that the Automatic Flush should be forgone.

5. The method of claim 4, further comprising:
recording a number of stall uses during which a manual flush did not negate an Automatic Flush in response to the computing whether to forgo the Automatic Flush.

6. The method of claim 5, further comprising:
determining whether a water volume per flush of the toilet should be adjusted based on the number of stall uses during which the manual flush did not negate an Automatic Flush of the toilet.

7. The method of claim 6, further comprising:
adjusting water volume per flush automatically via a pre-programmed set of instructions in response to determining that the water volume per flush of the toilet should be adjusted.

8. The method of claim 7, further comprising:
recording an amount of each water volume per flush adjustment.

9. The method of claim 6, further comprising:
generating a notification to a facilities manager in response to determining that the water volume per flush of the toilet should be adjusted.

10. The method of claim 1, comprising:
comparing a plurality of the latch open timestamps and/or the latch close timestamps with each other to determine a duration of a usage cycle of the toilet stall.

11. The method of claim 10, comprising:
determining whether the duration of the usage cycle is within a predetermined range; and
triggering an Automatic Flush of the toilet at the determined time to flush only if the usage cycle is within the predetermined range.

12. The method of claim 1, comprising:
comparing a plurality of the latch open timestamps and/or the latch close timestamps with each other to determine if an accidental latching or unlatching event has occurred, wherein the accidental latching or unlatching event is not associated with an intended latching or unlatching of the toilet stall door; and
negating a redundant Automatic Flush actuation in response to determining that an accidental latching or unlatching event has occurred.

13. The method of claim 1, wherein the stall use profile comprises a start time and an end time of each stall use.

14. The method of claim 13, comprising:
computing an average number of flushes per stall usage cycle based on the stall use profile.

15. The method of claim 14, comprising:
comparing the average number of flushes per stall for a plurality of toilet stalls.

16. The method of claim 15, wherein the plurality of toilet stalls are configured with different types of Automatic Flushing mechanisms.

17. The method of claim 15, comprising:
performing a machine learning process to determine when to flush and how much water to use per flush based on the stall use profile and the average number of flushes per stall.

18. An apparatus for controlling actuations of an automatic toilet flushing mechanism, the apparatus comprising:
a processor;
memory in communication with the processor;
a toilet stall latch in communication with the processor, the toilet stall latch configured to communicate latch open event data and latch close event data to the processor for storage in the memory;
a toilet flush actuator in communication with the processor, the toilet flush actuator configured to automatically flush a toilet in response to an actuation signal from the processor;
a toilet flush sensor in communication with the processor, the toilet flush sensor configured to communicate toilet flush event data to the processor for storage in the memory;
wherein the processor is configured to implement a method for controlling actuations of an automatic toilet flushing mechanism, the method comprising:
acquiring and storing a manual flush timestamp in association with each occurrence of a manual flush of a toilet in a toilet stall;
acquiring and storing a latch open timestamp in association with each unlatching of the door latch configured on a door of the toilet stall;
acquiring and storing a latch close timestamp in association with each latching of the door latch;
comparing the manual flush timestamp, the latch open timestamp, and the latch close timestamp to generate a stall use profile;
determining whether to actuate an Automatic Flushing of the toilet based on the stall use profile.

19. The apparatus of claim 18, wherein the processor is configured to implement the method for controlling actuations of an automatic toilet flushing mechanism, and wherein the method further comprises:
triggering an Automatic Flush of the toilet at the determined time to flush; and
recording an Automatic Flush timestamp in association with the triggering.

* * * * *